Patented Sept. 14, 1948

2,449,080

UNITED STATES PATENT OFFICE

2,449,080

COMPOSITION FOR CONTROL OF POULTRY COCCIDIOSIS

Orley J. Mayfield, Neal F. Morehouse, and Arthur W. Walde, Charles City, Iowa, assignors to Dr. Salsbury's Laboratories, a corporation of Iowa No Drawing. Application December 6, 1940, Serial No. 368,912

12 Claims. (Cl. 167—53.1)

The present invention relates to the discovery of substances valuable for the treatment of coccidiosis in poultry. The present discovery has to do with the finding that the organic arsenics, p-hydroxy phenylarsonic acid, phenylarsonic acid, and their sodium, potassium, and ammonium salts, when administered in the feed or drinking water will satisfactorily control coccidiosis in poultry.

Coccidiosis in poultry is a condition produced by various species of protozoa, namely: *Eimeria mitis*, *E. praecox*, *E. acervulina*, *E. maxima*, *E. necatrix* and *E. tenella* which multiply in the lining of the intestines producing a severe inflammation of these tissues. Birds infested with these protozoa manifest symptoms, depending entirely upon the number of protozoa present in the intestinal tract, varying from mild bowel disorders to severe bowel disorders, emaciation, hemorrhage, anemia and death.

Various forms of organic arsenicals have been used as medical agents. Many such agents, which have been used extensively in medicines, such as atoxyl and arsenphenamines, are constructed for intravenous use and are unstable in water solutions, thereby making them unsuitable for administration to poultry by adding these substances to the drinking water for the control of coccidiosis. We have found that certain arsonic acids and many of their salts, including the sodium, potassium and ammonium salts, which are freely soluble in water, stable in water, and are readily consumed in the water by the birds, have value as medicating agents making it possible to control coccidiosis in poultry by their administration in the drinking water as well as in the feed. Thus it has been found that the arsonic acid compounds within the purview of the invention in effect comprise pharmaceutical substances which may be administered by oral ingestion in concentration sufficient to manifest a therapeutic effect in the control of coccidiosis, as by the prevention or treatment thereof, essentially without causing any toxicity, or at least without resulting in excessive toxicity. There follow typical examples of the use of suitable arsonic acids and sodium salts thereof, for the purposes of the invention.

Example 1

On November 6, 1939, 4 New Hampshire Red chicks hatched September 19 were placed on the following medication. Bird No. 1 received .1% p-hydroxy phenylarsonic acid in all the drinking water consumed throughout the experiment. Bird No. 2 received .2% p-hydroxy phenylarsonic acid in all the drinking water consumed throughout the experiment. Birds No. 3 and No. 4 served as controls and they were given no medication but allowed the same feed and quarters as the other two birds. On November 9, 1939, at 5 p. m. each bird was infected with approximately 150,000 sporulated oocysts of *Eimeria acervulina*. On November 13, 1939, each bird was infected with approximately 100,000 sporulated oocysts of *Eimeria tenella*.

Examination of the droppings showed more than 200 oocysts per field present in those from the two control birds during the 5th, 6th, 7th and 8th days following infection with the intestinal coccidium, *Eimeria acervulina*, and none in those from the two treated birds. Moderate to severe hemorrhages were observed in the two control birds during the 5th to the 8th day following the infection with cecal coccidium, *Eimeria tenella*, but none in the treated birds.

This test shows that p-hydroxy phenylarsonic acid when administered in the water at the rate of .1% to .2% satisfactorily controls coccidiosis due to *Eimeria acervulina* and *Eimeria tenella*.

Example 2

On November 23, 1939, 6 Barred Rock chicks hatched September 28, 1939, were divided into three groups of two birds each. Birds Nos. 1 and 2 received .05% p-hydroxy phenylarsonic acid in all their drinking water consumed throughout the experiment. Birds Nos. 3 and 4 received .025% p-hydroxy phenylarsonic acid in all their drinking water consumed throughout this experiment. Birds Nos. 5 and 6 served as controls and they were given no medication but allowed the same feed and quarters as the other four birds. On November 29, 1939, each chick was given approximately 135,000 sporulated oocysts of *Eimeria tenella*.

No hemorrhages resulted in the treated birds, but the control birds suffered severe hemorrhages from about the 5th to the 9th day after infection.

This experiment shows that p-hydroxy phenylarsonic acid even in doses as low as .025% when administered in the drinking water 6 days before infection with coccidia (*Eimeria tenella*) will entirely prevent coccidiosis.

Example 3

On December 29, 1939, 16 New Hampshire Red chicks hatched on November 18, 1939, were divided into four groups of four birds each. Birds Nos. 1–4, inclusive, received 1.5 grams of n-butylarsonic acid, 2.7 grams sodium phenolsulphonate and .2 gram calcium phenolsulphonate dissolved in 3000 cc. water. These birds received this concentration of medication throughout the experiment. Birds Nos. 5-8, inclusive, received 1.5 grams ethylarsonic acid, 2.7 grams sodium phenolsulphonate, and .2 gram calcium phenolsulphonate dissolved in 3000 cc. of water. These birds received this concentration of medication throughout the experiment. Birds Nos. 9-12, inclusive, received 1.5 grams phenylarsonic acid plus 2.7 grams sodium phenolsulphonate and .2 gram calcium phenolsulphonate dissolved in 3000 cc. water. These chicks received this concentration of medication throughout the experiment. Birds Nos. 13-16, inclusive, served as controls and they were given no medication but allowed the same feed and quarters as the other 12 birds. On January 5, 1940, each bird was infected with approximately 100,000 sporulated oocysts of *Eimeria tenella*.

Severe hemorrhages resulted in the four control birds five days after infection, and three of the four birds died. The treated birds were practically free from hemorrhages, but three died from poisoning, one which received n-butylarsonic acid, and two which received phenylarsonic acid.

In this experiment n-butylarsonic acid, ethyl and phenylarsonic acid when combined with calcium and sodium phenolsulphonate gave 100% control of coccidiosis due to *Eimeria tenella*.

Example 4

On May 1, 1940, 12 Black Minorca chicks hatched March 14, 1940, were divided into three groups of four birds each. Birds Nos. 1-4, inclusive, received sodium p-hydroxy phenylarsonate at the rate of .052% in all their drinking water consumed throughout the experiment. Birds Nos. 5-8, inclusive, received sodium p-hydroxy phenylarsonate at the rate of .061% in all their drinking water consumed throughout the experiment. Birds 9-12, inclusive, served as controls and they were given no medication but allowed the same feed and quarters as the other eight birds. On May 1, 1940, each chick was infected with approximately 100,000 sporulated oocysts of *Eimeria maxima*.

None of the treated birds had any coccidia present in their droppings six days after infection, and no coccidia appeared on the 6th, 7th, 8th or 9th day following infection; whereas the controls had over 200 oocysts per field present on the sixth day and nearly as many on the ninth day after infection. In this experiment, sodium p-hydroxy phenylarsonate when given at the rate of .052% and .061% in the water controlled coccidiosis due to *Eimeria maxima* 100%.

Example 5

On May 1, 1940, 12 Black Minorca chicks hatched March 14, 1940, were divided into three groups of four birds each. Birds Nos. 1-4, inclusive, received sodium p-hydroxy phenylarsonate at the rate of .052% in all their drinking water consumed throughout the experiment. Birds Nos. 5-8, inclusive, received sodium p-hydroxy phenylarsonate at the rate of .061% in all their drinking water consumed throughout the experiment. Birds Nos. 9-12, inclusive, served as controls and they were given no medication but allowed the same feed and quarters as the other eight birds. On May 6, 1940, each chick was infected with approximately 100,000 sporulated oocysts of *Eimeria tenella*.

None of the treated birds showed any evidence of hemorrhages, but the controls suffered severe hemorrhages on the sixth day after infection, which had not entirely ceased on the eighth day after, and one control died.

In this experiment sodium p-hydroxy phenylarsonate when administered in the water at the rate of .052% and .061% was 100% effective in controlling coccidiosis due to *Eimeria tenella*.

Example 6

On February 15, 1940, 20 New Hampshire Red chicks hatched January 12, 1940, were divided into 5 groups of 4 birds each. Birds Nos. 1-4, inclusive, received a preferred composition in tablet form at the rate of 10 tablets per gal. of water in all they consumed throughout the experiment. Birds Nos. 5-8, inclusive, received the same composition at the rate of 12 tablets per gallon of water in all they consumed throughout the experiment. Birds Nos. 9-12, inclusive, received the same composition at the rate of 14 tablets per gallon of water in all they consumed throughout the experiment. Birds Nos. 13-16, inclusive, received the same composition at the rate of 16 tablets per gallon of water in all they consumed throughout the experiment. Birds Nos. 17-20, inclusive, received unmedicated drinking water throughout the experiment and these birds were held as controls for the experiment.

The formula for this preferred composition is as follows:

| | Grams |
|---|---|
| p-Hydroxy-phenylarsonic acid | 13.3 |
| Sodium phenolsulphonate | 33.2 |
| Zinc phenolsulphonate | 43.5 |
| Copper arsenite | 2.62 |
| Lactose | 9.0 |
| Boric acid | 9.23 |

On February 18, 1940, at 11 a. m. each chick was infected with approximately 100,000 sporulated oocysts of *Eimeria tenella*.

The control birds suffered severe hemorrhages on the 5th and 6th days after infection, and two died. Three of the treated birds suffered from hemorrhages, and one of these died. None of the treated birds in the groups including birds Nos. 5 to 8 and 13 to 16 suffered any hemorrhages or other ill effects. In this experiment, p-hydroxy phenylarsonic acid controlled cecal coccidiosis due to *Eimeria tenella* 100% when administered at the rate of 12 and 16 tablets, containing 12% p-hydroxy phenylarsonic acid, per gallon of drinking water.

Example 7

On March 29, 1940, 24 White Leghorn chicks hatched February 22, 1940, were divided into 6 groups of 4 birds each. Birds Nos. 1-4, inclusive, received a composition in tablet form, hereinafter called No. 1, at the rate of 10 tablets per gallon of drinking water in all they consumed throughout the experiment. Birds Nos. 5-8, inclusive, received the same composition, No. 1, at the rate of 14 tablets per gallon of drinking water in all they consumed throughout the experiment. Birds Nos. 9-12, inclusive, received the same composition, No. 1, at the rate of 18 tablets per gallon of drinking water in all they consumed throughout the experiment. Birds Nos. 13-16, inclusive, received a similar composition, hereinafter called No. 2, at the rate of 10 tablets per gallon of drinking water in all they consumed throughout the experiment. Birds Nos. 17-20, inclusive, received a similar composition, hereinafter called No. 3, at the rate of 10 tablets per gallon of drinking water in all they consumed throughout the experiment. Birds Nos. 21-24, inclusive, received unmedicated water and these birds were held as controls for the experiment. The formula for tablets, Nos. 1, 2, 3 is as follows:

|  | No. 1 |  | No. 2 | No. 3 |
|---|---|---|---|---|
| Sodium p-hydroxy phenylarsonate | 29.43 g. | 19.6% | 15.11 g. & % | 13.6 g. & % |
| Sodium phenolsulphonate | 36.73 g. | 24.49% | 29.00 g. & % | 30.51 g. & % |
| Zinc phenolsulphonate | 58.86 g. | 39.24% | 39.24 g. & % | 39.24 g. & % |
| Lactose | 12.18 g. | 8.12% | 8.12 g. & % | 8.12 g. & % |
| Copper arsenite | .3 g. | .2% | .2 g. & % | .2 g. & % |
| Boric acid | 9.4 g. to 104 g. granules | 8.33% | 8.33 g. & % (7 to 74) | 8.33 g. & % (7.25 to 80) |

On April 4, 1940, at 3 p. m. each chick was infected with approximately 100,000 sporulated oocysts of *Eimeria tenella*.

In this experiment, the composition designated No. 1 containing 19.6% sodium p-hydroxy phenylarsonate controlled coccidiosis due to *Eimeria tenella* 100% when fed at the rate of 14 and 18 tablets per gallon of drinking water.

The composition designated No. 2 containing 15.11% sodium p-hydroxy phenylarsonate when fed at the rate of 10 tablets per gallon of drinking water failed to control this disease.

The composition designated No. 3 containing 13.6% p-hydroxy phenylarsonic acid controlled this disease 100% in two of the four birds treated and caused the infection to be very light in two other birds in this test.

All control birds showed a heavy infection with *Eimeria tenella*.

Example 8

On April 27, 1940, 20 Black Minorca chicks hatched March 14, 1940, were divided into 5 groups of 4 birds each. Birds Nos. 1-4, inclusive, received a composition in tablet form, hereinafter called No. 4, at the rate of 16 tablets per gallon of drinking water in all they consumed throughout the experiment. Birds Nos. 5-8, inclusive, received a similar composition, hereinafter called No. 5, at the rate of 16 tablets per gallon of drinking water in all they consumed throughout the experiment. Birds Nos. 9-12, inclusive, received a similar composition, hereinafter called No. 6, at the rate of 16 tablets per gallon of drinking water in all they consumed throughout the experiment. Birds Nos. 13-16, inclusive, received a similar composition, hereinafter called No. 7, at the rate of 16 tablets per gallon of drinking water in all they consumed throughout the experiment. Birds Nos. 17-20, inclusive, received unmedicated drinking water and these birds were held as controls for the experiment. The formula for "Phen-O-Sal" tablets Lab. No. 6084 Nos. 4, 5, 6 and 7 is as follows:

|  | No. 4 | No. 5 | No. 6 | No. 7 |
|---|---|---|---|---|
|  | Mg. | Mg. | Mg. | Mg. |
| p-Hydroxy phenylarsonic acid | 60 | 60 | 60 | 60 |
| Sodium phenolsulphonate |  |  | 480 |  |
| Zinc phenolsulphonate |  | 480 |  |  |
| Calcium phenolsulphonate |  |  |  | 24 |
| Lactose | 1,044 | 564 | 564 | 1,020 |
| Boric acid | 96 | 96 | 96 | 96 |

On April 30, 1940, at 4:30 p. m. each chick was infected with approximately 100,000 sporulated oocysts of *Eimeria tenella*.

All of the control birds suffered severe hemorrhages on the 6th and 7th days after infection. The treated birds were free from hemorrhages except one which died.

In this experiment, the composition designated No. 4 prevented coccidiosis due to *E. tenella* 100%. One bird died of arsenic poisoning.

The composition designated No. 5 was 100% effective in preventing coccidiosis due to *E. tenella*. One bird died of cecal coccidiosis.

The composition designated No. 6 was 100% effective in preventing coccidiosis due to *E. tenella*. Mortality 0%.

The composition designated No. 7 was 100% effective in preventing coccidiosis due to *E. tenella*. Mortality 0%.

In the above experiment all the treated birds received the p-hydroxy phenyl arsonic acid at the rate of .025% in the drinking water.

Example 9

On May 25, 1940, 20 New Hampshire Red chicks hatched on April 2, 1940, were divided into 5 groups of 4 birds each. Birds Nos. 1-4, inclusive, received sodium p-hydroxy phenylarsonate at the rate of 1.2 grams per gallon of drinking water throughout the experiment. Birds Nos. 5-8, inclusive, received sodium p-hydroxy phenylarsonate at the rate of 1.4 grams per gallon of drinking water throughout the experiment. Birds Nos. 9-12, inclusive, received sodium p-hydroxy phenylarsonate at the rate of 1.68 grams per gallon of drinking water throughout the experiment. Birds Nos. 13-16, inclusive, received sodium p-hydroxy phenylarsonate at the rate of 1.92 grams per gallon of drinking water throughout the experiment. Birds Nos. 17-20, inclusive, received unmedicated water throughout the experiment and these birds were held as controls. On May 28, 1940, each chick was infected with approximately 100,000 sporulated oocysts of *Eimeria tenella*.

One of the birds treated with 1.2 g. sodium p-hydroxy phenyl arsonate per gallon of water suffered severe hemorrhages on the fifth, sixth and seventh days after infection. All other treated birds were entirely free from hemorrhages. The control birds all suffered very severe hemorrhages and one died.

In this experiment, sodium p-hydroxy phenylarsonate prevented coccidiosis due to *Eimeria tenella* 100% in doses of 1.4 g. per gallon (.036% in the water), 1.68 g. per gallon (.044% in the water) and 1.92 g. per gallon (.05% in the water.)

Example 10

On June 10, 1940, 12 New Hampshire Red chicks hatched May 18, 1940, were divided into 3 groups of 4 birds each. Birds Nos. 1-4, inclusive, received a composition in tablet form hereinafter called No. 8 at the rate of 10 tablets per gallon of drinking water, 24 hours before infection with *Eimeria tenella*. Birds Nos. 5-8, inclusive, received the same composition at the rate of 10 tablets per gallon of drinking water, 48 hours before infection with *E. tenella*. Birds were allowed this medication in all the drinking water consumed throughout the experiment. Birds Nos. 9–12, inclusive, received unmedicated water throughout the experiment and these birds were held as controls.

The formula for this composition designated No. 8 is as follows:

| | Grams |
|---|---|
| Sodium phenolsulphonate | 37.8 |
| Ammonium phenolsulphonate | 18.9 |
| Potassium phenolsulphonate | --- |
| Sodium p-hydroxy phenolarsonate | 20.0 |
| Lactose | 33.3 |
| Boric acid | 10.0 |
| | 120.0 |

On June 13, 1940, each bird was infected with approximately 100,000 sporulated oocysts of *Eimeria tenella*.

None of the treated birds suffered hemorrhages, but the control birds suffered and one died.

In this experiment, the composition designated No. 8 containing sodium p-hydroxy phenylarsonate prevented coccidiosis due to *Eimeria tenella* 100% when administered both 24 and 48 hours before infection with *Eimeria tenella*. In the above experiment all the treated birds received sodium p-hydroxy phenyl arsonate at the rate of .052% in the drinking water.

*Example 11*

On July 9, 1940, 24 New Hampshire Red chicks hatched on June 4, 1940, were divided into three groups of 8 birds each. Birds Nos. 1–8, inclusive, received a composition hereinafter called No. 9 at the rate of 10 tablets per gallon of drinking water in all they consumed throughout the experiment. Birds Nos. 9–16, inclusive, received the same composition at the rate of 14 tablets per gallon of drinking water in all they consumed for the first two days; 10 tablets per gallon of drinking water for the third and fourth days and 8 tablets per gallon of drinking water thereafter throughout the experiment. Birds Nos. 17–24, inclusive, received unmedicated drinking water throughout the experiment and these birds were held as controls for the experiment.

The formula for the composition designated No. 9 is as follows:

| | Grams |
|---|---|
| Sodium phenolsulphonate | 2000 |
| Ammonium phenolsulphonate | 1000 |
| Sodium p-hydroxy phenylarsonate | 539.71 |
| Lactose | 2280.65 |
| Boric acid | 528.89 |
| | 6349.25 |

On July 11, 1940, each bird was infected with approximately 100,000 sporulated oocysts of *Eimeria tenella*.

Two of the eight control birds died and all suffered very severe hemorrhages on the 5th and 6th days after infection which did not cease until the 8th day. None of the treated birds died and only two suffered hemorrhages.

In this experiment, this composition designated No. 9 at the rate of 10 tablets per gallon of drinking water controlled coccidiosis due to *Eimeria tenella* 100% in six of the eight birds given this medication. The two remaining birds showed some coccidiosis but recovered.

This same composition, No. 9, given at the rate of 14 tablets for the first two days, 10 tablets for the third and fourth days and 8 tablets per gallon of drinking water thereafter controlled coccidiosis due to *Eimeria tenella*.

*Example 12*

On July 22, 1940, 12 New Hampshire Red chicks hatched on June 1, 1940, were divided into 3 groups of 4 birds each. Birds Nos. 1–4, inclusive, received the same composition as in Example 11, No. 9, at the rate of 14 tablets per gallon of drinking water throughout the experiment. Birds Nos. 5–8, inclusive, received 16 tablets per gallon of drinking water throughout the experiment. Birds Nos. 9–12, inclusive, received unmedicated water throughout the experiment and these birds were held as controls for the experiment.

On July 25, 1940, each bird was infected with approximately 100,000 sporulated oocysts of *Eimeria maxima*.

None of the treated birds showed coccidia in the droppings, but the control birds all presented upwards of 200 oocysts per field by the 6th day after infection.

In this experiment, the composition designated No. 9 containing sodium p-hydroxy phenylarsonate as an active ingredient, controlled coccidiosis due to *Eimeria maxima* 100%. In the above experiment the treated birds received sodium p-hydroxy phenyl arsonate at the rate of .036% and .042%, respectively, in the drinking water.

As illustrated by Examples 6, 7, 8, 10, 11 and 12, one of the important advantages of the invention is the readiness with which the arsonic acid or arsonate may be combined with other water soluble ingredients in a tablet for dissolution in water for administration in drinking water at any desired strength to suit different ages and kinds of birds.

The invention may be applied in many other ways for treating conditions for which arsenic has been found to have value as a specific, being much less toxic than metallic arsenic and inorganic arsenic compounds heretofore utilized for similar purposes.

Our invention is not restricted to the forms and proportions of the arsonic acid derivatives given in the examples, which are illustrative rather than critical, but what we claim is as follows:

1. A composition for the control of coccidiosis in poultry comprising a water soluble substance of the group consisting of phenylarsonic acid, p-hydroxy phenylarsonic acid and water soluble salts thereof, and a water soluble phenolsulphonate the concentration of said water soluble substance being sufficient, when orally ingested, to manifest a therapeutic effect on cecal coccidiosis without causing excessive toxicity.

2. A water soluble composition for the control of coccidiosis in poultry comprising a mixture including phenylarsonic acid and a phenolsulphonate.

3. A composition for the control of coccidiosis in poultry comprising an aqueous solution of p-hydroxy phenyl arsonic acid in the approximate concentration range of 0.2%–0.025%.

4. A composition for the control of coccidiosis in poultry by oral administration comprising a poultry feed containing p-hydroxy phenyl arsonic acid in the approximate concentration range of 0.025% to 0.2%.

5. An aqueous composition for the control of coccidiosis in poultry containing p-hydroxy phenyl arsonic acid in the approximate concentration range of 0.025% to 0.05%.

6. A composition for the control of coccidiosis in poultry comprising poultry feed containing a substance from the group consisting of phenyl arsonic acid, p-hydroxy phenyl arsonic acid and water soluble salts thereof.

7. A water soluble composition for the control of coccidiosis in poultry comprising a mixture containing p-hydroxy phenyl arsonic acid and a phenolsulphonate.

8. A composition for the control of coccidiosis in poultry comprising poultry feed containing p-hydroxy phenylarsonic acid in concentration sufficient, when orally ingested, for manifesting a therapeutic effect on cecal coccidiosis without causing excessive toxicity.

9. A composition for the control of coccidiosis in poultry by oral administration comprising a vehicle adapted for oral ingestion containing a substance from the group consisting of phenylarsonic acid, p-hydroxy phenylarsonic acid and water soluble salts thereof, in the approximate concentration range of 0.2% to 0.025%.

10. A composition for the control of coccidiosis in poultry by oral administration comprising an aqueous solution of a substance from the group consisting of phenylarsonic acid, p-hydroxy phenylarsonic acid and water soluble salts thereof, in the approximate concentration range of 0.2% to 0.025%.

11. An aqueous composition for the control of coccidiosis in poultry containing phenylarsonic acid in the approximate concentration of 0.05%.

12. A composition for the control of coccidiosis in poultry comprising poultry feed containing phenylarsonic acid in concentration sufficient, when orally ingested, for manifesting a therapeutic effect on cecal coccidiosis without causing excessive toxicity.

ORLEY J. MAYFIELD.
NEAL F. MOREHOUSE.
ARTHUR W. WALDE.

REFERENCES CITED

The following references are of record in the file of this patent:

UNITED STATES PATENTS

| Number | Name | Date |
|---|---|---|
| 1,549,503 | Preiswerk | Aug. 11, 1925 |
| 2,158,446 | Werft | May 16, 1939 |

FOREIGN PATENTS

| Number | Country | Date |
|---|---|---|
| 264,924 | Germany | Sept. 25, 1913 |

OTHER REFERENCES

Chemical Abstracts, vol. 25, page 4611 (1931).
Beach et al., Circular 300 of University of Calif. Agri. Experiment Station, page 13, Dec. 1925.
Organic Syntheses, vol. 4, pages 65 to 58 (1925).